Aug. 11, 1931.  J. M. KAUFMAN  1,818,404

CORNER SUPPORT FOR GLASS RIMS

Filed July 11, 1929

INVENTOR
Jacob M. Kaufman,
BY
ATTORNEYS

Patented Aug. 11, 1931

1,818,404

UNITED STATES PATENT OFFICE

JACOB M. KAUFMAN, OF DETROIT, MICHIGAN, ASSIGNOR TO AMERICAN SHOW CASE & MFG. CO., OF DETROIT, MICHIGAN, A CORPORATION OF MICHIGAN

CORNER SUPPORT FOR GLASS RIMS

Application filed July 11, 1929. Serial No. 377,577.

The present invention pertains to a corner support for glass rims designed particularly in displaying merchandise on counters or tables. The principal object of the invention is to provide a device of this character which requires no fastening means liable to break the glass and which may be readily mounted on the top of a table or counter in order to hold two or more plates of glass at an angle to each other. As distinguished from present devices used for similar purposes, the device of this invention also provides means for grasping and holding the glass more securely than has hitherto been customary, without the use of screws passing through the glass.

According to the invention, the corner support is a member presenting at least two channels angularly arranged for receiving the ends of two plates of glass at an angle to each other. The mouths of the channels are slightly restricted, and the channels are made of a spring metal, so that the restricted mouths will engage tightly with the glass plates received therein. Moreover, the plates are grooved where engaged by the mouth edges of the channel members, whereby an effective gripping means on the plates is provided.

The invention is also applicable to intermediate supports for holding abutting edges of aligned plates together with a partition perpendicular to the plates. In this case the support has three channel portions, two of which engage the aligned plates and the third of which receives the partition.

The invention is fully disclosed by way of example in the following description and in the accompanying drawings in which—

Reference to these views will now be had by use of like characters which are employed to designate corresponding parts throughout.

Figure 1:
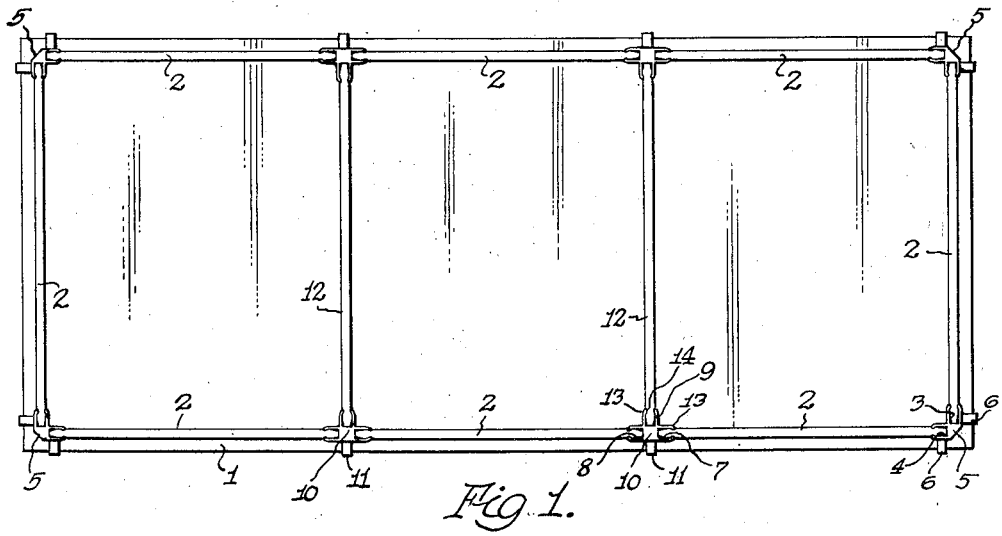
Figure 1 is a plan view of a glass rim assembled according to the invention.
Figure 2:
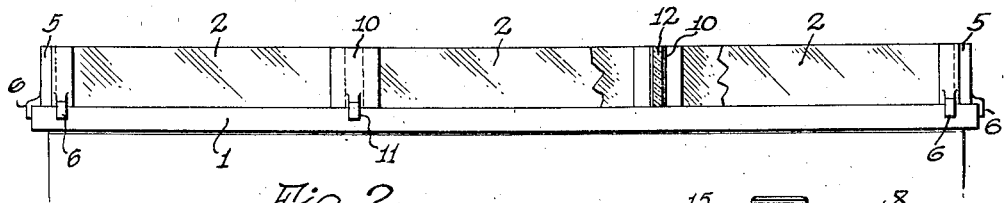
Fig. 2 is a side elevation thereof, partly in section.
Figures 3, 4:
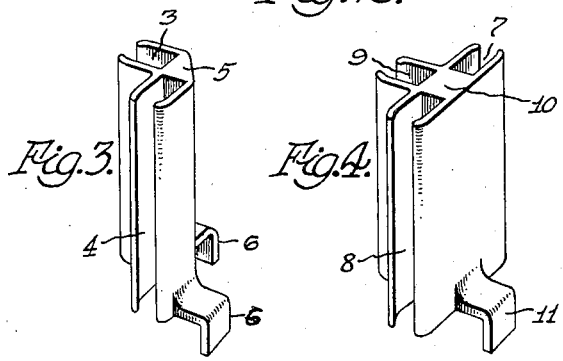
Fig. 3 is a perspective view of one of the corner supports.
Fig. 4 is a perspective view of an intermediate support.
Figure 5:
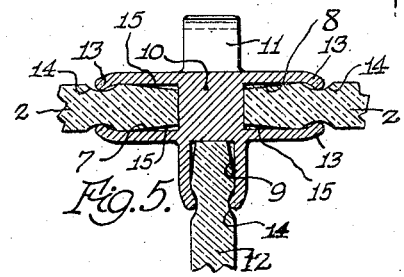
Fig. 5 is a cross section of a horizontal support, showing the glass plates received therein.
Figure 6:
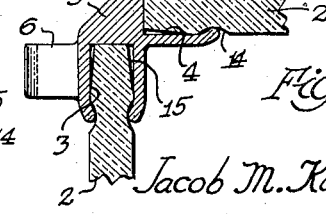
Fig. 6 is a similar section of a corner support.
Figure 7:
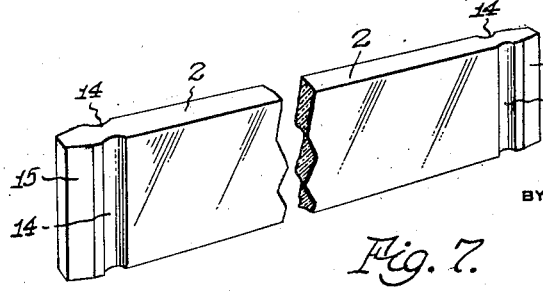
Fig. 7 is a perspective view of one of the glass plates.

In Figs. 1 and 2 the numeral 1 indicates the top of a table or counter on which the glass rim is constructed. The rim consists of several rectangular plates of glass 2 arranged to form a rectangular enclosure, and in some cases, having transverse partitions. The supports for the corners of the rim are metallic members presenting two channels 3 and 4 at an angle to each other. The channels are preferably at right angles, inasmuch as the walls of the rim are at right angles to each other in most cases. The space formed by the backs of the channels is filled as indicated by the numeral 5. At the ends of the channels are right angular legs 6 formed at right angles to each other to engage and fit over the corner of a rectangular table top. The corner supports are preferably cast or otherwise formed in one piece as illustrated in Fig. 3. In the case of small installations, it is merely necessary to apply these supports to the corners of the table top and insert the glass plates into the channels thereof, so that the eight channels thus provided will support four plates of glass.

In larger installations, however, some of the walls of the rim may be larger than any of the plates, and in such cases it is desirable and necessary to provide some means for holding together the several plates that go to make up one wall. Under these circumstances there is provided an intermediate member which presents two channels 7 and 8 arranged in alignment but in back-to-back relation and facing opposite directions. A third channel member 9 is positioned intermediate the channels 7 and 8 and faces at right angles thereto. The space between the backs of the channels 7 and 8 is filled as at 10, and accordingly the entire structure may be cast as a unitary member in the same manner as the corner piece shown in Fig. 3. The back of the intermediate member is formed with a single right angular leg 11 which fits over an edge of the table top 1, so that the intermediate channel 9 faces towards the opposite edge. The lateral channels 7 and 8 receive the ends of aligned plates 2 in a given wall, as clearly illustrated in Fig. 1. Similar intermediate members are placed opposite one another along opposite edges of the top 1, so that the intermediate channels 9 thereof face one another and are positioned to receive the ends of transverse glass plates 12 which function as partitions.

It will also be seen that the free longitudinal edges of the channel walls are bent inwardly to a slight extent as indicated by the numeral 13, whereby the mouths of the channels are restricted. Where the glass plates are engaged by these edges, their faces are grooved as at 14, and the ends of the plates are tapered at 15 to facilitate insertion in the channels. The metal constituting the channel walls has sufficient resiliency to permit spreading in order to receive the maximum thickness of the glass plates and then to spring into the groove.

In this manner there is provided a corner support which holds the glass plates with more firmness than usual and nevertheless may readily be dismantled as is customary in the use of glass rims. Also, there is provided an equally effective means for joining aligned glass plates and at the same time supporting the transverse partitions.

Although a specific embodiment of the invention has been illustrated and described, it will be apparent that various alterations in the details of construction may be made without departing from the scope of the invention as indicated by the appended claims.

What I claim is:

1. A corner support for glass rims comprising a pair of channel members united with their backs at an angle to each other, both free edges of each channel member being bent inwardly, whereby to restrict the mouths of said channel members, and an angular leg extending from said channel members and adapted to engage the edge of a table top, in combination with a glass plate having one end received in one of said channel members and having grooves in opposite faces at said end and positioned to receive the bent edges of the receiving channel member.

2. In a glass rim construction, a channel member having both of its free edges bent inwardly to restrict the throat of said member, and a glass plate having one end received in said channel member and having grooves in opposite faces at said end and positioned to receive the bent edges of the channel member, said end being tapered from the grooves.

In testimony whereof I affix my signature.

JACOB M. KAUFMAN.